US005619659A

United States Patent [19]
Kikinis et al.

[11] Patent Number: 5,619,659
[45] Date of Patent: *Apr. 8, 1997

[54] SYSTEM FOR EXTENDING ISA BUS WITHOUT USING DEDICATED DEVICE DRIVER SOFTWARE BY USING $E^2P^2$ INTERFACE WHICH PROVIDES MULTIPLEXED BUS SIGNAL THROUGH STANDARD PARALLEL PORT CONNECTOR

[75] Inventors: Dan Kikinis, Saratoga; William J. Seiler, Scotts Valley; Pascal Dornier, Sunnyvale; William S. Jocobs, Santa Cruz, all of Calif.

[73] Assignee: Elonex IP Holdings Ltd., London, United Kingdom

[*] Notice: The term of this patent shall not extend beyond the expiration date of Pat. No. 5,457,785.

[21] Appl. No.: 497,610

[22] Filed: Jun. 30, 1995

Related U.S. Application Data

[62] Division of Ser. No. 16,122, Feb. 10, 1993, Pat. No. 5,457,785.

[51] Int. Cl.$^6$ ............................ G06F 13/00; G06F 13/12; G06F 13/20; G06F 13/36
[52] U.S. Cl. ....................... 395/281; 395/821; 395/825; 395/882; 395/883; 395/500; 364/238; 364/239; 364/240.1; 364/240.4
[58] Field of Search ..................................... 395/500, 750, 395/822, 831, 281, 309, 821, 825, 882, 883; 365/238, 239, 240.1, 240.4

[56] References Cited

U.S. PATENT DOCUMENTS

| | | | |
|---|---|---|---|
| 4,509,113 | 4/1985 | Heath | 364/200 |
| 4,530,069 | 7/1985 | Desrochers | 364/900 |
| 4,631,698 | 12/1986 | Walsh et al. | 364/900 |
| 4,972,470 | 11/1990 | Farago | 380/3 |
| 5,123,092 | 6/1992 | Buxton et al. | 395/250 |
| 5,133,076 | 7/1992 | Hawkins et al. | 395/800 |
| 5,179,710 | 1/1993 | Coschieri | 395/750 |
| 5,187,645 | 2/1993 | Spalding et al. | 361/393 |
| 5,317,695 | 5/1994 | Celi, Jr. | 395/275 |
| 5,335,338 | 8/1994 | Proesel | 395/500 |
| 5,440,755 | 8/1995 | Harwer et al. | 395/800 |
| 5,555,436 | 9/1996 | Gavish | 395/821 |

*Primary Examiner*—Thomas C. Lee
*Assistant Examiner*—Ki S. Kim
*Attorney, Agent, or Firm*—Donald R. Boys

[57] ABSTRACT

A bus interface system for expanding the I/O capability of a portable computer utilizes a parallel port connector with master interface circuitry connected to the internal ISA I/O bus of the portable computer and driving a 25-conductor Centronics-type cable as an intermediate bus. The master interlace circuitry is device-driver-transparent, and multiplexes address data, and control information over a byte-wide avenue of the intermediate bus according to premapped state translation tables. In a preferred embodiment a single peripheral I/O device comprising a slave circuitry may be connected to the 25-pin port, and the slave circuitry demultiplexes the intermediate bus states, providing a synthesized sub-set of ISA states to drive the peripheral device. In another embodiment a docking box comprises a bus with multiple I/O ports, such as a network port, a COM serial port, and additional floppy and hard disk drives. Power circuitry is provided for driving a single connected peripheral device, and for recharging a docked portable computer.

6 Claims, 13 Drawing Sheets

| Bit | Enables / Disables |
|---|---|
| 0 | For binary value: 0 = hold $E^2P^2$ in reset state |
| 1 | 1 = SPP  2 = EPP  3 = $E^2P^2$ <br> 4 thru 6 = undefined |
| 2 | 7 = reset slave |
| 3 | Net0 = 8 or 16 Bit Data Size |
| 4 | Opt0 = 8 or 16 Bit Data Size |
| 5 | Net1 = 8 or 16 Bit Data Size |
| 6 | Reserved |
| 7 | Reserved |
| 8 | Network Port 0 |
| 9 | Option 0 |
| 10 | Network Port 1 |
| 11 | Secondary IDE Hard Disk |
| 12 | Secondary Floppy Disk |
| 13 | LPT Port 1 |
| 14 | Primary Floppy Disk |
| 15 | Serial COM Port 1 |

Fig. 5

| Bit | Host IRQ # Enabled |
|---|---|
| 0 | |
| 1 | |
| 2 | |
| 3 | |
| 4 | |
| 5 | |
| 6 | |
| 7 | |
| 8 | IRQ 5 |
| 9 | IRQ 6 |
| 10 | IRQ 7 |
| 11 | IRQ 15 |
| 12 | 1 = Clock On; 0 = Clock Off |
| 13 | (Future use to enable IRQ4 |
| 14 | |
| 15 | |

Fig. 6

| PIN # | SPP Signal | EPP Signal | $E^2P^2$ Signal | Type | $E^2P^2$ Description |
|---|---|---|---|---|---|
| 1 | STROBE/ | WRITE/ | STROBE/ | O | Negative going half of differential bus strobe pair |
| 2-9 | D(7:0) | AD(7:0) | AD(7:0) | I/O | Address/Data/Status. Bidirectional, byte wide |
| 10 | ACK/ | INTR | INTR | I | Interrupt. Driven active asynchronously by slave on status change |
| 11 | BUSY | WAIT/ | IOCHRDY | I/O | Buffered X-IOCHRDY. Driven active asynchronously by X-ISA device to extend cycle. |
| 12 | PE | USER0 | CY0 | O | Cycle type. Encoded signals from the MASTER select the slave operation which will be executed on the next strobe. |
| 13 | SELECT | USER1 | CY1 | O | |
| 14 | AUTOFD/ | DATASTB/ | CY2 | O | |
| 15 | ERROR/ | USER2 | CY4 | O | |
| 16 | INIT/ | USER3 | STROBE | O | Positive going half of differential bus strobe pair, AD and CY are clocked by this signal. |
| 18-19 | GND | GND | PWR | P | Bidirectional power pins. Host can supply or receive power over these lines. |
| 20-25 | GND | GND | GND | P | Ground |

Fig. 7

| Type | CY lines Hex Value |
|---|---|
| RESET_A | 0 |
| SPP_STATE | 1 |
| PF_START_DELAY | 2 |
| PF_DACK2_ON | 3 |
| PF_IOR_ON | 4 |
| PF_DACK2_OFF | 5 |
| IDLE | 6 |
| ALS | 7 |
| ADDR_HOLD | 8 |
| WRITE_DATAL | 9 |
| WRITE_DATAH | A |
| IOW_ON | B |
| IOW_DWELL | C |
| IOW_CMD_OFF | D |
| IOR_ON | E |
| IOR_DWELL | F |
| READ_DATAL | 10 |
| READ_DATAH | 11 |
| IOR_CMD_OFF | 12 |
| READ_STATUS | 13 |
| STATUS_TURNAROUND | 14 |
| WRITE_STATUS-IMAGE | 15 |
| WAIT_CMD_END | 16 |
| DACK2_ON | 17 |
| TC_ON | 18 |
| unused | 19 |
| RESET_B | 1A |
| RESET_C | 1B |
| ATTN_SETTLE | 1C |
| unused | 1D |
| DACK_TC_ON | 1E |
| unused | 1F |

Fig. 8

| DEVICE | ISA I/O ADDRESS | E²P² ADDRESS | DATA WIDTH |
| --- | --- | --- | --- |
| NET0 | 300-31F | 00-1F | Configurable |
| OPT0 | 220-227 | 20-27 | Configurable |
| OPT1 | 228-22F | 28-2F | Configurable |
| NET1 | 340-35F | 40-5F | Configurable |
| SHD | 170 | 60 | 16 Bit |
| SHD | 171-177 | 61-67 | 8 Bit |
| SFDC/SHD | 370-377 | 70-77 | 8 Bit |
| LPT1/EPP | 378-37F | 78-7F | 8 Bit |
| PFDC/PHD | 3F0-3F7 | F0-F7 | 8 Bit |

Fig. 9

| Pin | Signal | I/O TYPE | Input | Output Tri-State | Pull Up |
|---|---|---|---|---|---|
| 1 | IOW/ | I | ILST | | |
| 2 | DACK2/ | I | I | IST | |
| 3 | TC | I | IST | | |
| 4 | RESET | I | IST | | |
| 5 | CLK | I | ILST | | |
| 6 | GND | GND | | | |
| 7 | DRQ2 | O | | OS16/4 | |
| 8 | IRQ15 | O | | OS16/4 | |
| 9 | IRQ7 | O | | OS16/4 | |
| 10 | IRQ3 | O | | OS16/4 | |
| 11 | IRQ6 | O | | OS16/4 | |
| 12 | VCC | PWR | | | |
| 13 | IRQ5 | O | | OS16/4 | |
| 14 | IOCHRDY | O | | | OS16/4 |
| 15 | GND | GND | | | |
| 16 | IOCS16/ | O | | | OS16/4 |
| 17 | SD0 | I/O | IST | OS16/4 | |
| 18 | SD1 | I/O | IST | OS16/4 | |
| 19 | SD2 | I/O | IST | OS16/4 | |
| 20 | SD3 | I/O | IST | OS16/4 | |
| 21 | GND | GND | | | |
| 22 | SD4 | I/O | IST | OS16/4 | |
| 23 | SD5 | I/O | IST | OS16/4 | |
| 24 | SD6 | I/O | IST | OS16/4 | |
| 25 | SD7 | I/O | IST | OS16/4 | |
| 26 | GND | GND | | | |
| 27 | SD8 | I/O | IST | OS16/4 | |
| 28 | SD9 | I/O | IST | OS16/4 | |
| 29 | SD10 | I/O | IST | OS16/4 | |
| 30 | SD11 | I/O | IST | OS16/4 | |
| 31 | GND | GND | | | |
| 32 | SD12 | I/O | IST | OS16/4 | |
| 33 | SD13 | I/O | IST | OS16/4 | |
| 34 | SD14 | I/O | IST | OS16/4 | |
| 35 | SD15 | I/O | IST | OS16/4 | |
| 36 | VCC | PWR | | | |
| 37 | GND | GND | | | |
| 38 | PS3 | I/O | ILST | OS24 | |
| 39 | PS2 | I/O | ILST | OS24 | |
| 40 | GND | GND | | | |

Fig. 10

| Pin | Signal | I/O TYPE | Input | Output | Tri-State | Pull Up |
|---|---|---|---|---|---|---|
| 41 | GND | | | | | |
| 42 | n/c | I | ILST | IST | | IPU1 |
| 43 | PS1 | I | ILST | | | IPD1 |
| 44 | PS0 | I/O | ILST | | OS24/12 | |
| 45 | AD7 | PWR | | | | |
| 46 | VCC | GND | | | | |
| 47 | GND | I/O | ILST | | OS24/12 | |
| 48 | AD6 | I/O | ILST | | OS24/12 | |
| 49 | AD5 | GND | | | | |
| 50 | GND | I/O | ILST | | OS24/12 | |
| 51 | AD4 | I/O | ILST | | OS24/12 | |
| 52 | AD3 | GND | | | | |
| 53 | GND | O | | | OS24/12 | |
| 54 | PC3 | I/O | IST | | OS24/12 | |
| 55 | AD2 | PWR | | | | |
| 56 | VCC | GND | | | | |
| 57 | GND | O | | | OS24/12 | |
| 58 | PC2 | I/O | IST | | OS24/12 | |
| 59 | AD1 | GND | | | | |
| 60 | GND | I/O | IST | | OS24/12 | |
| 61 | PS4 | I/O | IST | | OS24/12 | |
| 62 | AD0 | GND | | | | |
| 63 | GND'PC1 | O | | | OS24/12 | |
| 64 | PC0 | O | | | OS24/12 | |
| 65 | GND | GND | | | | |
| 66 | SA0 | I | IST | | | |
| 67 | SA1 | I | IST | | | |
| 68 | SA2 | I | IST | | | |
| 69 | SA3 | I | IST | | | |
| 70 | SA4 | I | IST | | | |
| 71 | SA5 | I | IST | | | |
| 72 | VCC | PWR | | | | |
| 73 | SA6 | I | IST | | | |
| 74 | GND | GND | | | | |
| 75 | SA7 | I | IST | | | |
| 76 | SA8 | I | IST | | | |
| 77 | SA9 | I | IST | | | |
| 78 | AEN | I | IST | | | |
| 79 | CS/ | I | IST | | | |
| 80 | IOR/ | I | IST | | | |

Fig. 11

| Pin | Signal | I/O TYPE | Input | Output | Tri-State | Pull Up |
|---|---|---|---|---|---|---|
| 1 | IOW/ | O | | OB16/4 | | |
| 2 | DACK2/ | O | | OB16/4 | | |
| 3 | TC | O | | OB16/4 | | |
| 4 | RSTDRV | O | | OB16/4 | | |
| 5 | STB | I | IST | | | |
| 6 | GND | ND | | | | |
| 7 | DRQ2 | I | uIST | | | IPU1 |
| 8 | IRQ15 | I | uIST | | | IPU1 |
| 9 | IRQ7 | I | uIST | | | IPU1 |
| 10 | IRQ3 | I | uIST | | | IPU1 |
| 11 | IRQ6 | I | uIST | | | IPU1 |
| 12 | VCC | PWR | | | | |
| 13 | IRQ5 | I | uIST | | | IPU1 |
| 14 | IOCHRDY | I | uIST | | | |
| 15 | GND | GND | | | | IPU1 |
| 16 | N/C | | | | | |
| 17 | SD0 | I/O | uIST | | OS16/4 | |
| 18 | SD1 | I/O | uIST | | OS16/4 | |
| 19 | SD2 | I/O | uIST | | OS16/4 | |
| 20 | SD3 | I/O | uIST | | OS16/4 | |
| 21 | GND | GND | | | | |
| 22 | SD4 | I/O | uIST | | OS16/4 | |
| 23 | SD5 | I/O | uIST | | OS16/4 | |
| 24 | SD6 | I/O | uIST | | OS16/4 | |
| 25 | SD7 | I/O | uIST | | OS16/4 | |
| 26 | GND | GND | | | | |
| 27 | SD8 | I/O | uIST | | OS16/4 | |
| 28 | SD9 | I/O | uIST | | OS16/4 | |
| 29 | SD10 | I/O | uIST | | OS16/4 | |
| 30 | SD11 | I/O | uIST | | OS16/4 | |
| 31 | GND | GND | | | | |
| 32 | SD12 | I/O | uIST | | OS16/4 | |
| 33 | SD13 | I/O | uIST | | OS16/4 | |
| 34 | SD14 | I/O | uIST | | OS16/4 | |
| 35 | SD15 | I/O | uIST | | OS16/4 | |
| 36 | VCC | PWR | | | | |
| 37 | GND | GND | | | | |
| 38 | PWRON_RST | I | uIST | | | IPU1 |
| 39 | N/C | | | | | |
| 40 | GND | GND | | | | |

Fig. 12

| Pin | Signal | I/O TYPE | Input | Output | Tri-State | Pull Up |
|---|---|---|---|---|---|---|
| 41 | N/C | | | | | |
| 42 | PS1 | O | | OB24/12 | | |
| 43 | PS0 | O | | OB24/12 | | |
| 44 | AD7 | I/O | uIST | | OS24/12 | |
| 45 | VCC | PWR | | | | |
| 46 | GND | GND | | | | |
| 47 | AD6 | I/O | uIST | | OS24/12 | |
| 48 | AD5 | I/O | uIST | | OS24/12 | |
| 49 | GND | GND | | | | |
| 50 | AD4 | I/O | uIST | | OS24/12 | |
| 51 | AD3 | I/O | uIST | | OS24/12 | |
| 52 | GND | GND | | | | |
| 53 | PC3 | I | uIST | | | |
| 54 | AD2 | I/O | uIST | | OS24/12 | |
| 55 | VCC | PWR | | | | |
| 56 | GND | GND | | | | |
| 57 | PC2 | I | uIST | | | |
| 58 | AD1 | I/O | uIST | | OS24/12 | |
| 59 | GND | GND | | | | |
| 60 | PS4 | I | uIST | | | |
| 61 | AD0 | I/O | uIST | | OS24/12 | |
| 62 | GND | GND | | | | |
| 63 | PC1 | I | uIST | | | |
| 64 | PC0 | I | uIST | | | |
| 65 | GND | GND | | | | |
| 66 | SA0 | O | | OB16/4 | | |
| 67 | SA1 | O | | OB16/4 | | |
| 68 | SA2 | O | | OB16/4 | | |
| 69 | SA3 | O | | OB16/4 | | |
| 70 | SA4 | O | | OB16/4 | | |
| 71 | SA5 | O | | OB16/4 | | |
| 72 | VCC | PWR | | | | |
| 73 | SA6 | O | | OB16/4 | | |
| 74 | GND | GND | | | | |
| 75 | SA7 | O | | OB16/4 | | |
| 76 | SA8 | O | | OB16/4 | | |
| 77 | SA9 | O | | OB16/4 | | |
| 78 | AEN | O | | OB16/4 | | |
| 79 | N/C | | | | | |
| 80 | IOR/ | O | | OB16/4 | | |

SYSTEM FOR EXTENDING ISA BUS WITHOUT USING DEDICATED DEVICE DRIVER SOFTWARE BY USING $E^2P^2$ INTERFACE WHICH PROVIDES MULTIPLEXED BUS SIGNAL THROUGH STANDARD PARALLEL PORT CONNECTOR

CROSS-REFERENCE TO RELATED DOCUMENTS

The present application is a divisional application of patent application 08/016,122, now U.S. Pat. No. 5,457,785.

FIELD OF THE INVENTION

The present invention is in the field of microcomputer external peripheral device interfaces and pertains in particular to interfacing of external peripheral devices to the central processor unit (CPU) of a general-purpose computer via a parallel input/output (PIO) port.

BACKGROUND OF THE INVENTION

Portable microcomputers came into existence soon after the popular acceptance of desktop models. Early models were basically compactly packaged versions of desktop personal computers and included most of the peripheral device capabilities of their larger counterparts. Manufacturers soon discovered a large market for much smaller and lighter models even though some peripheral device capability had to be left out. These laptop and smaller variants-called notebook computers have become the fastest growing segment of the computer market.

Advances in miniaturization of peripheral devices such as disk drives and phone modems has allowed manufacturers to add some of them into recent notebook computer models, thus restoring many capabilities associated with desktop computers. Despite these advances, a notebook computer incorporating both hard and floppy disk drives is considered by many to be too heavy for many purposes. Limited cable attachment space on the case and limited circuit board space has precluded the incorporation of ports for a full complement of external attachments readily available to desktop computers.

Some manufacturers have attempted to overcome these limitations by incorporating an external docking connector into the notebook computer's internal input/output (I/O)bus. Such a connector is designed to mate with a complementary connector in a larger desktop-style case, known typically as a docking box. Such a docking box may feature all or most of the peripheral device capabilities of a normal desktop computer. Because of the high-frequency, low-power electrical signals that must be passed through the docking connector, the docking connection must be vibration-free and shielded against radio-frequency emissions. When locked into its docking box a notebook computer gains most of the capabilities of a regular desktop computer, but at the cost of a significant amount of prime desktop real estate. A user may also have to put up with several interconnect cables as well as a power cord snaking across the desk.

An alternative method of expanding the peripheral device capabilities of both notebook and desktop computers is connection of external devices to a parallel port connected in turn to the internal I/O bus of the computer. PIO port devices have traditionally offered a simple and economical method for rapidly moving data between a computer and remote devices. Parallel port devices may be either bidirectional or unidirectional. The simplest form of PIO port consists of parallel data lines and addressable buffer circuits. Addition of control lines and state control circuitry enhances a parallel port device's capabilities.

Since their inception microcomputers have made extensive use of PIO ports as interfaces to control panel switches and indicator lights, keyboard switch matrixes, and external devices. The original personal computer introduced by International Business Machines (IBM) included a specialized parallel port on the monochrome display adapter expansion board for interfacing to a parallel interfaced printer. A separate printer adapter expansion board offered a similar parallel port, differing primarily in the I/O addresses of the port. The control lines and state control circuitry of the IBM printer parallel port were designed for compatibility with a subset of the widely used Centronics parallel printer interface.

Printers being receive-only devices, IBM designed its PIO port as a unidirectional output-only data port. The PIO port has signal connections for eight data lines (a Byte), four control lines going to the printer and five status lines coming from the printer. Prior art inventions made it possible to perform rudimentary bidirectional data transfers through the PIO port by cross-connecting for data lines (a Nibble) and the strobe control line with the five status lines.

IBM enhanced the PIO port for the PS/2™ line of computers to allow full bidirectional byte transfers using the normal subset of Centronics connections while maintaining compatibility with the PIO port. The same, or functionally similar, enhancements were adopted by many vendors of IBM-clone and IBM-compatible computer equipment. In current art the PS/2™ PIO port, known by IBM as the Type 1 parallel port, has become the standard parallel port (SPP). Special control routines are required to utilize the bidirectional capability of the SPP. A number of devices requiring high data transfer rates have been modified to interface through the bidirectional SPP, such as magnetic tape drives, magnetic and optical disk drives and even Small Computer System Interconnect (SCSI) bus controllers. In a later version, designated by IBM the Type 3 parallel port, 3 additional addressable control registers were added to the 3 registers in the SPP. The Type 3 parallel port has a capability to perform direct memory access (DMA) transfers through the SPP allowing a maximum parallel port throughput of approximately 2 megabytes per second.

Attempts to interface network adapters through the SPP, which is particularly desirable for notebook computers, revealed a need for passing both address and data bytes through the SPP with minimal latency. It was also found desirable to allow the external device to impose wait states on the CPU when it cannot immediately respond to an IO request. A consortium of manufacturers lead by Intel and Xircom created a specification for an enhanced parallel port (EPP) to meet this need. The EPP design provides for more versatile automatic use of the port control and status lines allowing the multiplexing of address and data bytes though the port, and synchronizing the computer processor with the external device controller during I/O instruction execution, when operating in its Fast Mode.

EPP, in Fast Mode, allows the CPU to read or write the contents of an addressable register in an external device controller with as few as two CPU instructions. EPP provides some of the capabilities of a mini-expansion bus multiplexed through the parallel port. However, EPP Fast Mode capabilities are only obtainable with the intervention of special CPU control routines. EPP Fast Mode provides only one interrupt signal path from the external devices and EPP provides only one interrupt request (IRQ) level on the expansion bus. These limitations have generally restricted interfacing of multiple external peripheral devices through a PIO port to devices that interface with an external Small Computer Systems Interconnect (SCSI) controller, which is connected through a PIO port. Such an external SCSI controller requires additional special CPU control routines, adds significant cost and in some cases adds additional power drain on battery powered computers.

What is needed is a way to connect a computer I/O bus to an external expansion bus by means of a tether rather than a docking mechanism, such as a PIO port and complimentary external device capable of multiplexing and demultiplexing a sufficiently complete range of expansion bus handshake signals through a Centronics-type printer cable to allow control of a subset of an ISA I/O bus. Such a parallel port would preferably have a default mode that is compatible with the SPP and a configurable mode that is compatible with EPP operation. Hardware devices in such PIO port devices should automatically and transparently translate and multiplex over the PIO port data lines, between the host I/O bus and a compatible external expansion bus controller, I/O addresses and IRQ's for configured peripheral devices.

SUMMARY OF THE INVENTION

In a preferred embodiment a device-driver-software-transparent bus interface system is provided for driving external I/O devices connected to a general purpose computer having an internal I/O bus. The system has an intermediate bus means with a width less than that of the internal I/O bus and having a byte-wide path for carrying multiplexed address, data, and control signals.

A master state-translation and control means connected to the internal I/O bus and to the intermediate bus is for translating states between the internal I/O bus and the intermediate bus according to at least one pre-mapped translation table. A slave state-translation means connected to the intermediate bus and having a separate parallel input/output means of the width of the internal bus is for translating states between the intermediate bus and the separate parallel input/output means.

In one embodiment the internal I/O bus is an ISA standard bus, the master state-translation means controls a 25-pin parallel port, and the intermediate bus comprises a 25-conductor parallel cable. A single I/O device having one of the slave state-translators may be connected to the intermediate bus and operated thereby. In a further embodiment the master translation means at a host computer may be automatically configured to operate the parallel port as a standard parallel port (SPP), an EPP standard port, or as an extended EPP port according to the invention following the state-translation tables independently of the CPU and device driver software.

In another embodiment, a slave state-translator resides in a docking box and synthesizes a subset of ISA bus states onto an ISA width bus within the docking box. The docking box may have multiple I/O ports, such as network ports, serial ports, printer ports, and also hard disk drives and floppy drives with controllers. Standard ISA-compatible printers may be connected either directly to the parallel port of the host or to an LPT port on the docking box, and be operated completely transparently.

Power circuitry according to the invention allows a single tethered peripheral to be powered from the portable computer's battery pack and also allows the portable computer's battery pack to be recharged over the intermediate bus while the portable computer is docked to a docking box according to the invention.

The invention disclosed more fully and claimed below provides a maximum I/O capability for a portable computer, while minimizing portable size and complexity, and does so while maintaining maximum flexibility through compatibility with prevailing I/O communication standards, such as SPP and EPP.

DESCRIPTION OF THE PREFERRED EMBODIMENTS

General Description

The present invention, called Extended Enhanced Parallel Port ($E^2P^2$) by the inventors, is an expansion bus interface for small computer systems. $E^2P^2$ comprises master circuitry in the host computer for interfacing to the host computer I/O bus, slave circuitry for interfacing to an external ISA expansion bus (X-ISA) and a multiplexed $E^2P^2$ bus between the two, multiplexing data, address and status information over a byte-wide pathway. Both the master and the slave circuitry interface to the $E^2P^2$ bus as well.

In some cases the X-ISA bus amounts to a single ISA compatible device connected to the slave circuitry. For example, $E^2P^2$ permits attachment of standard ISA bus I/O port devices to a host computer via a cable connection to the parallel port connector. $E^2P^2$ buffering and control circuit devices multiplex required I/O address, data and control signals over a byte-wide cable interface independently of host computer device control program steps. The cable interface, which is the $E^2P^2$ bus, is preferably a Centronics-type printer cable. $E^2P^2$ is also compatible with device control program steps and external devices intended to operate according to SPP and EPP standards.

$E^2P^2$ supports the following subset of ISA bus signals over the multiplexed intermediate bus, and synthesizes them in the external X-ISA bus:

| SD[0 ... 15] | DACK2/ | SA[0 ... 9] | TC |
|---|---|---|---|
| IOCS16/ | IRQ[5 ... 7] | IOCHRDY | IRQ15 |
| IOR/ | RESET | IOW/ | BCLK |
| AEN | OSC | DRQ2 | ALE |

$E^2P^2$ and a Single Peripheral Device

Figure 1:
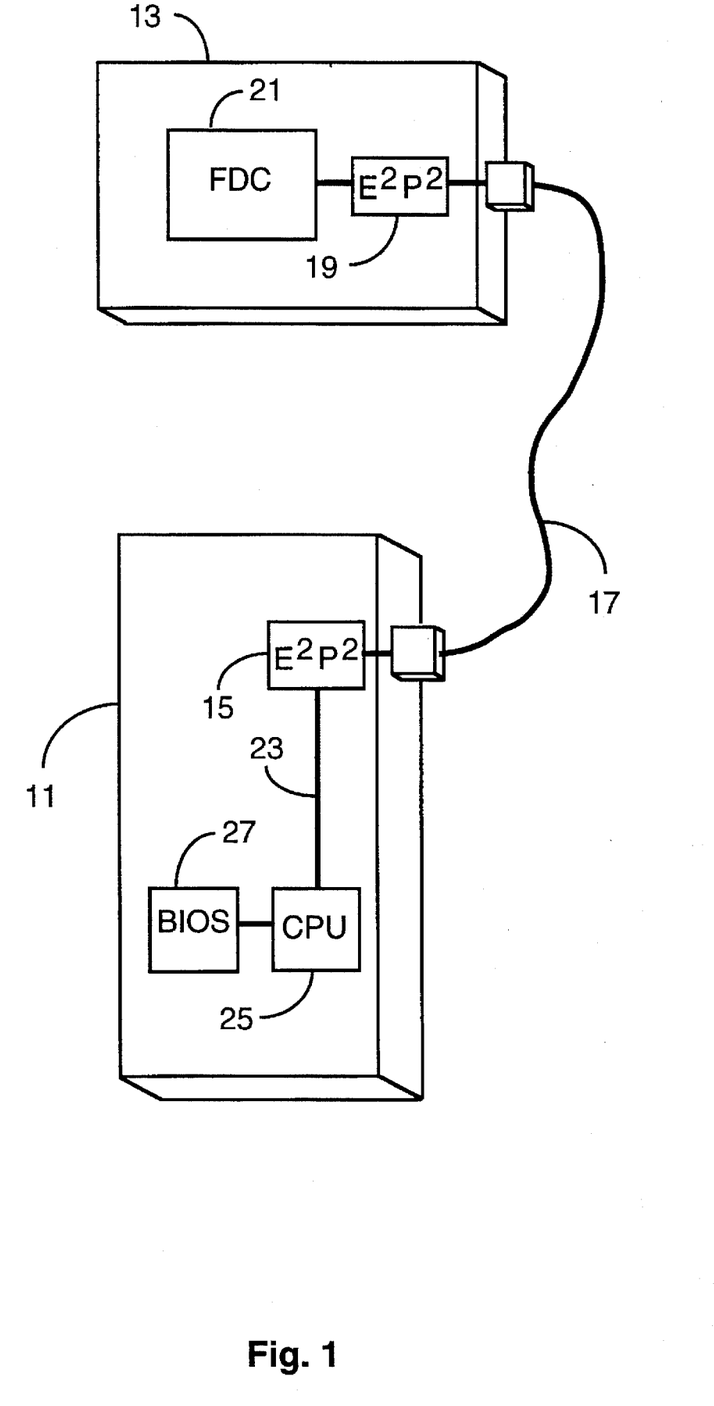
FIG. 1 is a largely schematic representation of a computer with an external disk storage device connected through a PIO port and signal cable according to the present invention.

FIG. 1 shows an embodiment of the present invention for a computer 11 and an external floppy disk drive 13. An $E^2P^2$ host port 15, comprising master circuitry according to the invention, multiplexes and demultiplexes I/O address, data and control signals transmitted over a cable 17 having 25-pin connectors and 25 conductors plus a shield, to slave circuitry 19 of the $E^2P^2$ system. There is also provision in a preferred embodiment for transmitting power over the cable. The slave circuitry interfaces the cable bus back to ISA standard bus protocol. In a preferred embodiment the master portion of the $E^2P^2$ system is rendered as a first application specific integrated circuit (ASIC) and the slave portion is rendered as a second ASIC.

Slave circuitry 19 comprises two state machines. One of these realizes a subset of an ISA bus state machine. The other translates between ISA bus states and $E^2P^2$ bus states. $E^2P^2$ host port 15 has multiple operating modes, which are described below. A floppy disk controller 21 interacts with the X-ISA bus state machine exactly as though it were connected to a host computer ISA bus, such as bus 23. The $E^2P^2$ extended expansion system, once configured, is completely transparent to standard AT device driver software for a list of supported devices (see FIG. 9).

A physical embodiment of an X-ISA bus is optional in an embodiment such as FIG. 1. The physical implementation of the bus is generally not required where one device, such as the floppy disk device shown, is tethered to the host port. CPU 25 executes floppy disk control program steps in a BIOS 27 and interacts with the floppy disk exactly as it would if floppy disk controller 21 were physically connected to the host computer ISA bus 23. It will be apparent to one with skill in the art that other peripheral devices such as a hard disk drive or network adapter might replace the floppy disk drive and controller in alternative embodiments of a single device connected to the host port.

In $E^2P^2$ an external peripheral device according to the invention that lack a power supply can draw current at +5 volts to power the device from $E^2P^2$ host port 15 via a conductor in cable 17. Details of this power circuitry are described below.

$E^2P^2$ With a Docking Box

Figure 2:
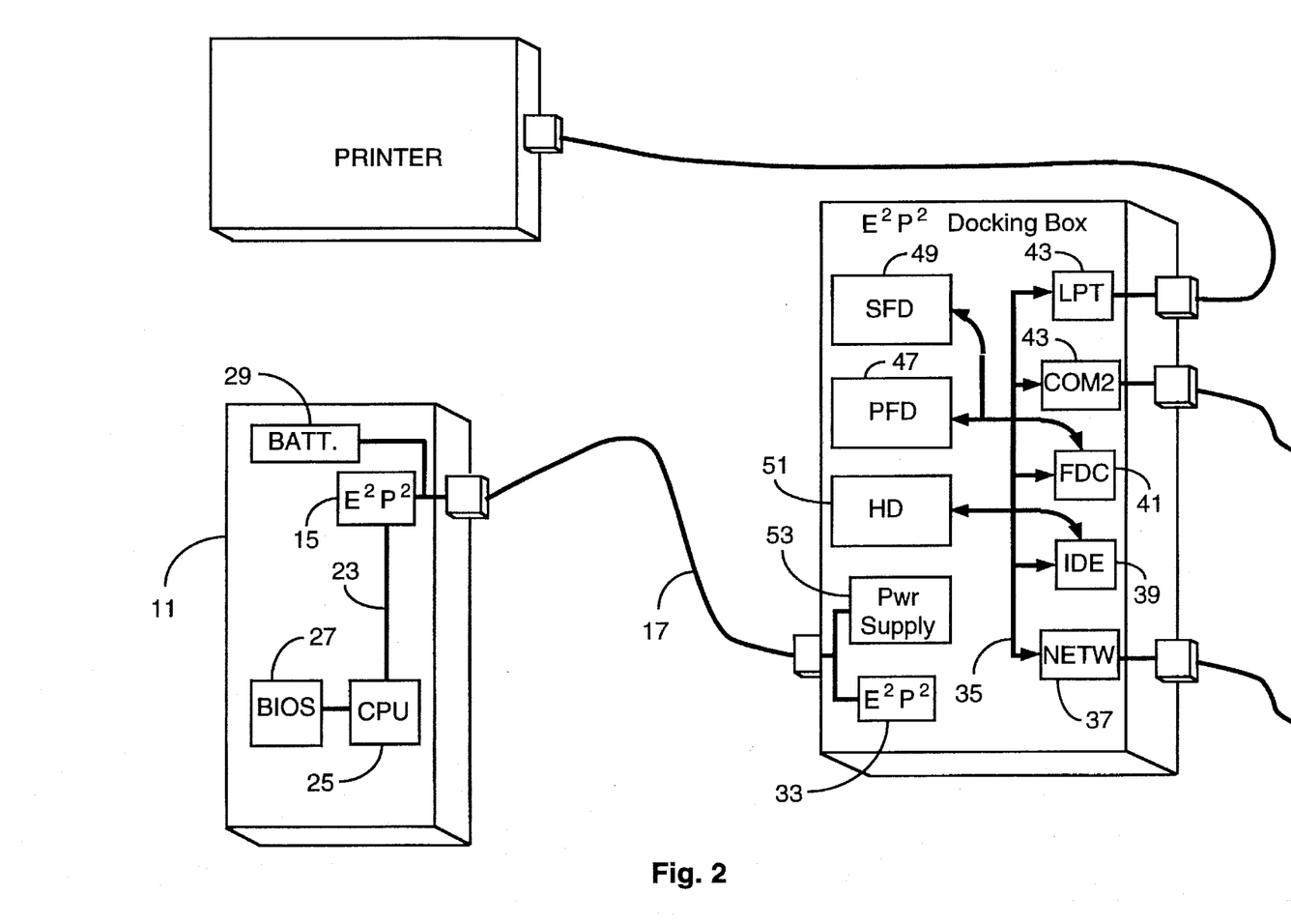
FIG. 2 is a largely schematic representation of a computer connected by a PIO port and a signal cable to a docking box according to the present invention.

FIG. 2 shows another embodiment of the present invention in which cable 17 connects $E^2P^2$ host port 15 of computer 11 to a docking box 31 comprising an X-ISA controller 33, an X-ISA bus 35, a network adapter 37, an integrated device electronics (IDE) interface 39, a floppy disk controller 41, a serial communication port 43, a parallel printer port 45, a primary floppy disk drive 47, a secondary floppy disk drive 49, a secondary hard disk drive 51, and a power supply 53. X-ISA controller 33 provides a bridge between the $E^2P^2$ bus of cable 17 and the X-ISA bus 35. X-ISA bus 35 is a typical ISA bus with multiple plug-in card connectors.

CPU 25 controls the states of the peripheral devices on bus 35 using the same program steps in BIOS 27 that it would use if these devices were attached to ISA bus 23. A battery 29, which supplies power for computer 11 when the computer is disconnected from external power sources, may receive up to 4 amperes of +12 volt charging current from power supply 53 while operating with docking box 31 connected via cable 17.

Figure 3:
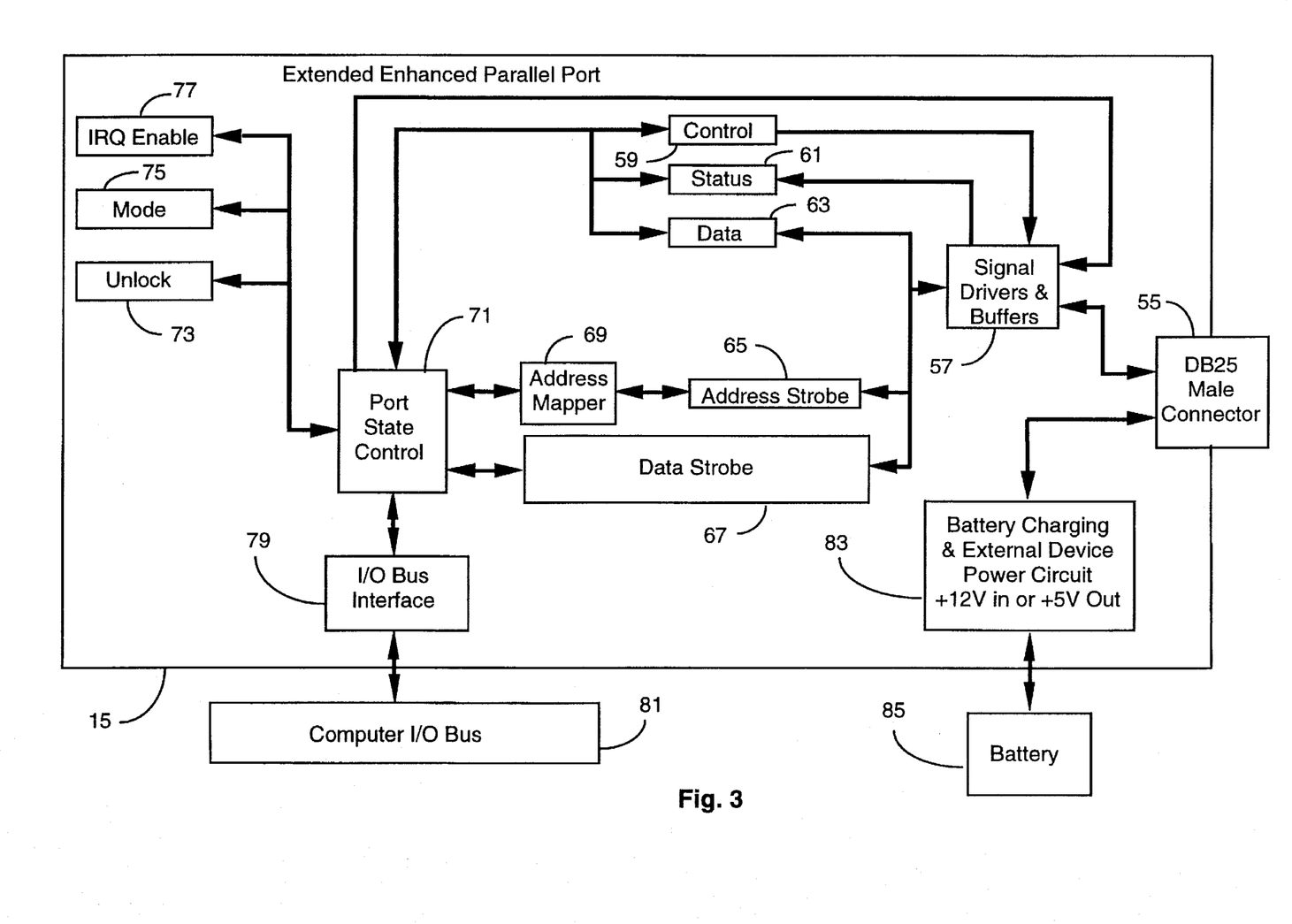
FIG. 3 is a largely schematic representation of a PIO port interface according to the present invention.

FIG. 3 illustrates an embodiment of $E^2P^2$ host port 15 of the present invention; that is, the master portion of the $E^2P^2$. A 25-pin cable connector 55 mates with a complementary connector on cable 17. A set of signal line drivers and buffers 57 interfaces cable 17 to a Control Register 59, a Status Register 61, a Data Register 63, and an Automatic Address Strobe Register 65, all of which are 1-byte (8-bit) registers. A 4-byte Automatic Data Strobe Register 67 is also interfaced to cable 17 by line drivers and buffers 57. The contents of the Automatic Data Strobe Register 67 may be addressed by byte or word. An Address Mapper 69 interfaces the Automatic Address Strobe Register 65 to a State Control and Data Router 71. The State Control and Data Router 71 also interfaces all the other registers listed above plus an Unlock Register 73, a Mode Register 75 and an IRQ Enable Register 77, which are 16-bit port-control registers, to an I/O Bus Interface 79. I/O Bus Interface 79 comprises bus driver and receiver devices for interfacing to a computer I/O bus 81.

Unlock Register 73 controls host write access to the other registers. After hardware reset the other registers are write protected. Writing the data pattern OOA5/h to the Unlock Register enables them. Writing any other value to the Unlock Register will restore write protection.

Figure 5:
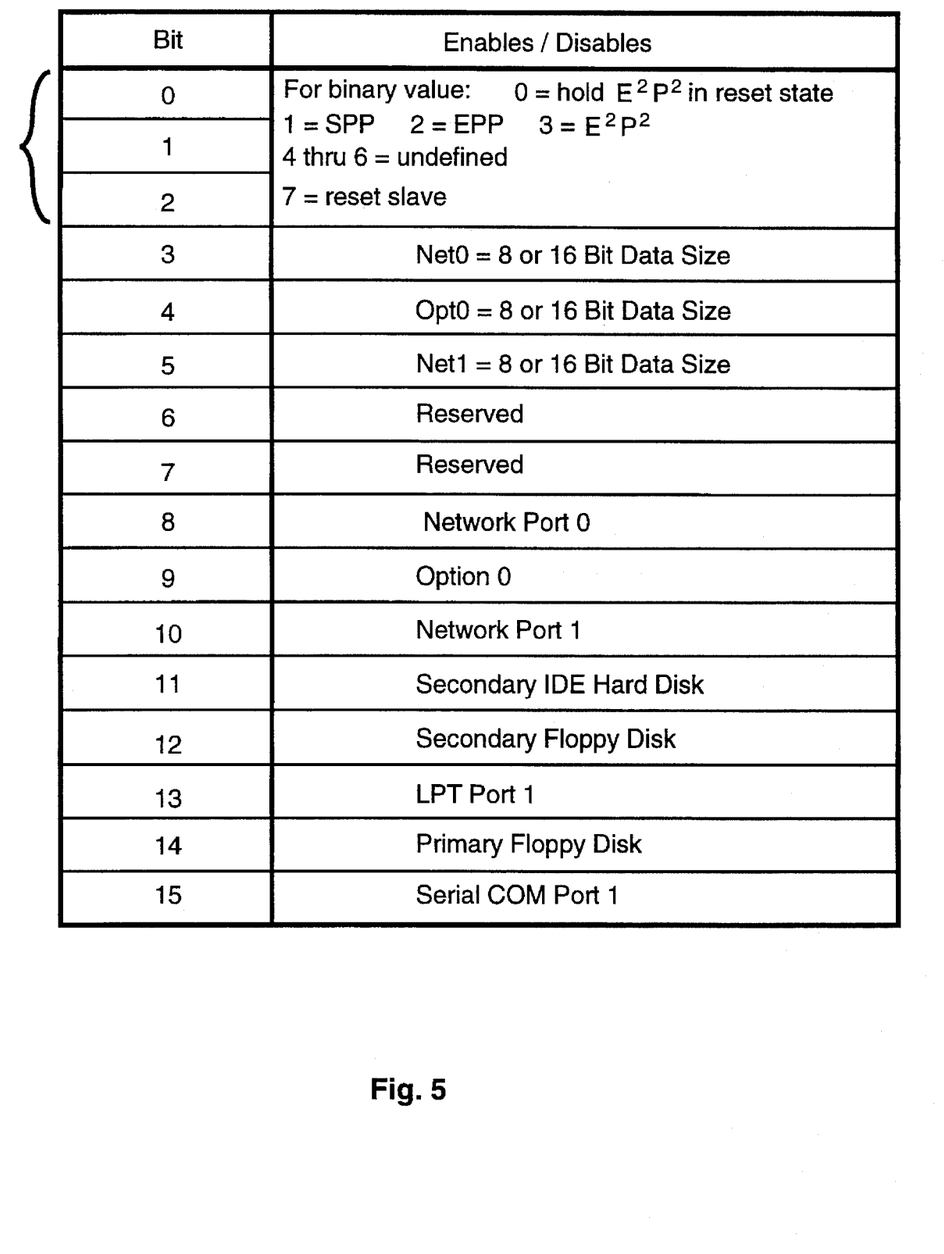
FIG. 5 is a table of bit assignments for the Mode Register for the PIO port of FIG. 3.

A table of functions controlled by bits of Mode Register 75 of FIG. 3 is shown in FIG. 5. Bits 0–2 control the operating mode of $E^2P^2$ 15. By using the binary decimal value of bits 0–3 as an indicator, up to eight operating modes are indicated as shown in FIG. 5. For example, if the decimal value of the binary representation of bits 0–3 is 3 (011), then the mode is $E^2P^2$. Bits 3–5 select the data width of network adapter ports zero and one and option port zero. Bits 6 and 7 are reserved. Bits 8–15 control ISA bus to $E^2P^2$ port address mapping and IRQ enables for the ports listed.

Figure 6:
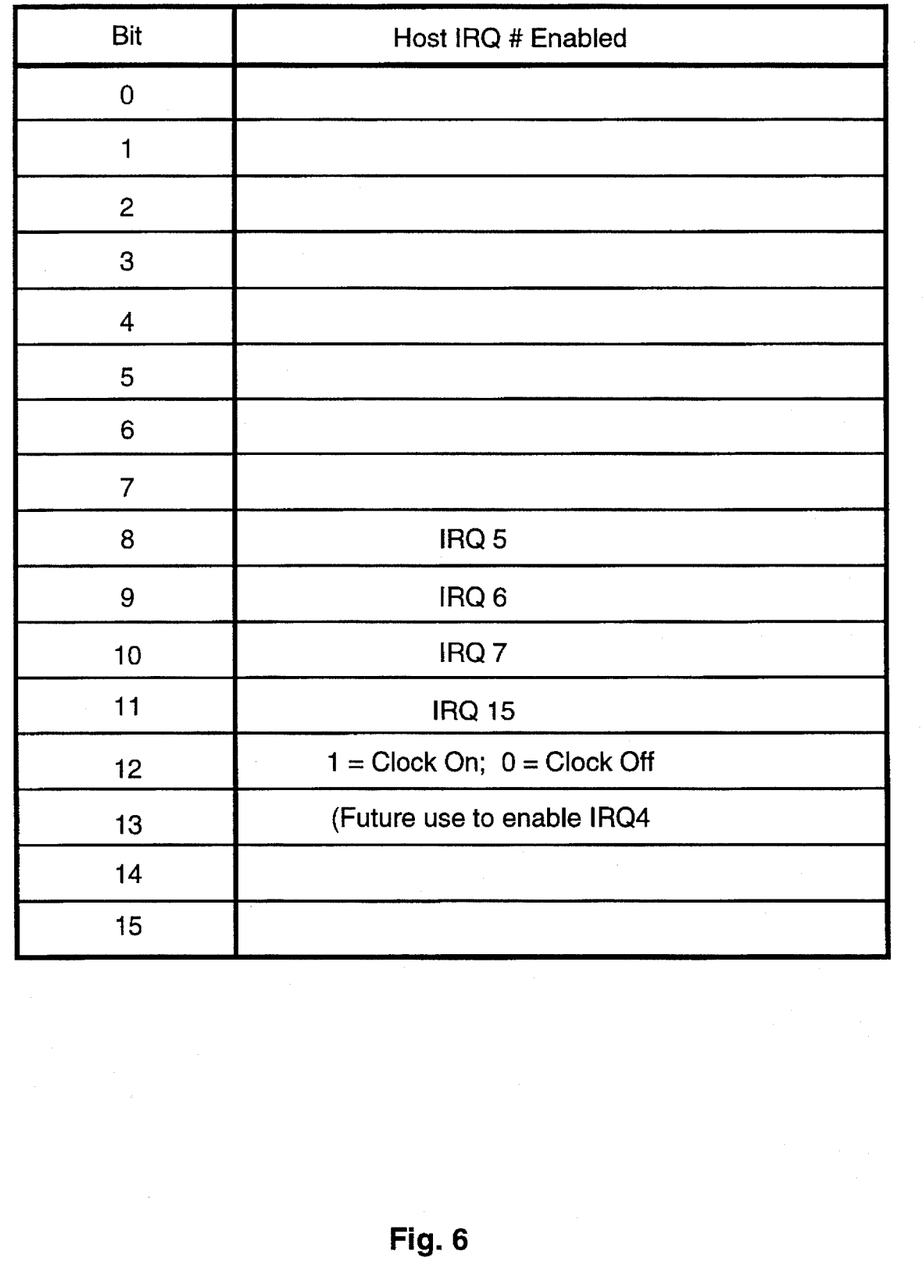
FIG. 6 is a table of bit assignments for the Interrupt Enable Register for the PIO port of FIG. 3.

FIG. 6 shows a table of ISA bus IRQ levels for use by X-ISA bus port devices. These are controlled by bits 8–11 of IRQ Enable Register 77, with bit 13 reserved for future use for IRQ4. A set bit enables the corresponding IRQ level. Bit 12 is used for Clock Off and Clock On.

Power Transfers

Figure 7:
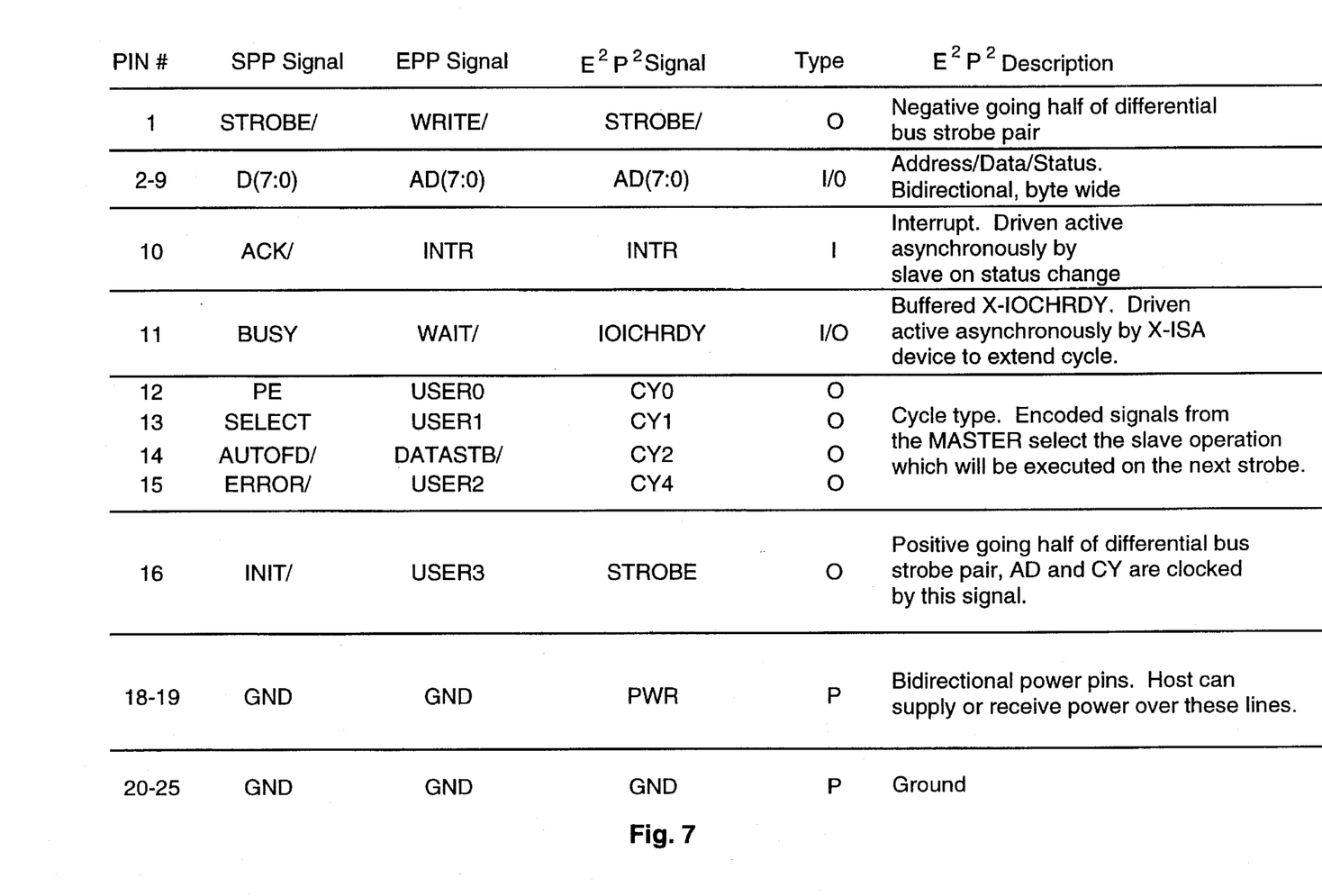
FIG. 7 is a table of cable pin and register bit assignments for each of 3 operating modes for the PIO port of FIG. 3.

In $E^2P^2$ mode an external port power circuit (XPPC) 83 connects between the +5 volt power supply of computer 11 and pin-18 or 19 of 25-pin cable connecter 55 that is defined as a ground pin for SPP and EPP modes, as shown in FIG. 7. XPPC 83 supplies +5 volt power to unpowered external devices, such as external floppy disk 13. In an embodiment of $E^2P^2$ host port 15 for a battery powered computer, XPPC 83 also allows X-ISA controller 33 to supply up to 4 amperes of +12 volt charging current to battery 85 from a power supply 53 while the $E^2P^2$ external port 33 is activated.

Figure 4:
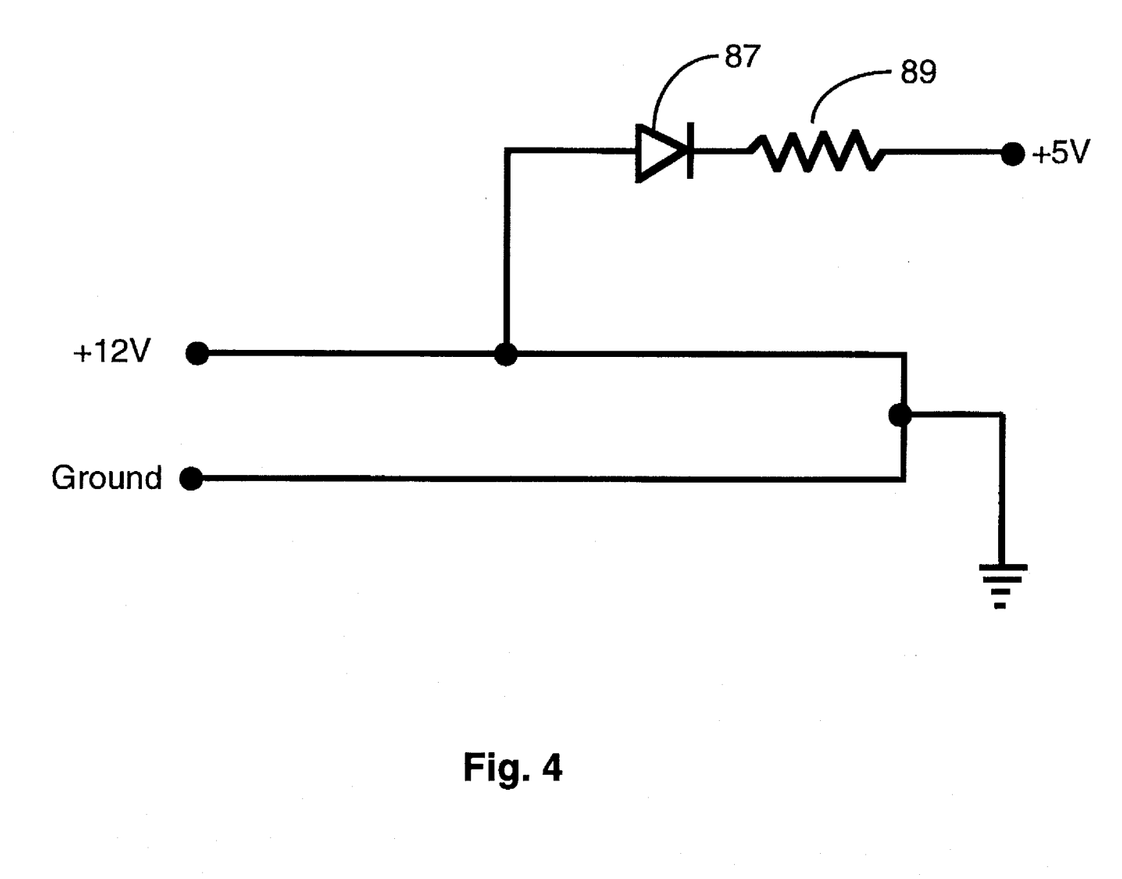
FIG. 4 is a schematic diagram showing a battery charging circuit for the PIO port of FIG. 3.

FIG. 4 shows an embodiment of XPPC 83. A diode 87 allows current to be drawn from the positive pole of +5 volt battery 85 (FIG. 3), thus causing the battery to charge, when +12 volts is applied to pin-18 of cable 55 by power supply 53. Diode 87 prevents a short circuit of battery 85 by attachment of cable 55 to an external device that grounds pin 18 of cable 55. A resistor 89 connected between pin 18 of cable 55 and system ground provides a regulating load to power supply 53.

A table showing the $E^2P^2$ bus cable connector pin to register connections and signal designations for all three modes of operation of $E^2P^2$ is shown in FIG. 7. One with skill in the art will recognize that the signal designations for SPP and EPP modes are compatible with devices built for those modes of operation.

$E^2P^2$ mode uses the data lines on pins 2–9 to multiplex external device address and data as do EPP devices, but also uses them to communicate IRQ state information. $E^2P^2$ mode allows the $E^2P^2$ bus state machine to use control and status lines, pin 1 and pins 10–16, for bus control signals of the $E^2P^2$ bus. Pins 12–15 carry $E^2P^2$ bus cycle (CY) signals. $E^2P^2$ mode switches the pins 1 and 16 line drivers from open ended to differential drive with positive drive voltage on pin 16 and negative drive voltage on pin 1. This differentially driven circuit carries the bus strobe pulse. One with skill in the art will recognize that there improved noise immunity offered by this arrangement. $E^2P^2$ mode also activates connection of XPPC 83 to pin 18 and 19. Pins 20–25 are connected to chassis ground in all three parallel port operating modes.

$E^2P^2$ supports a subset of the ISA peripheral status lines. These are:

IRQ[5 ... 7] IRQ 15 DRQ2/DACK2

These status lines are monitored by the slave portion of the system. Whenever there is a change in status the $E^2P^2$ signal INTR is asserted to the host $E^2P^2$ device. At the completion of the current $E^2P^2$ cycle the host $E^2P^2$ device will perform a status read cycle followed immediately by a write cycle to a Status Image Register in the slave circuitry. When the Status Image Register matches the current state of the X-ISA status lines, the slave de-asserts the INTR signal.

Figure 8:
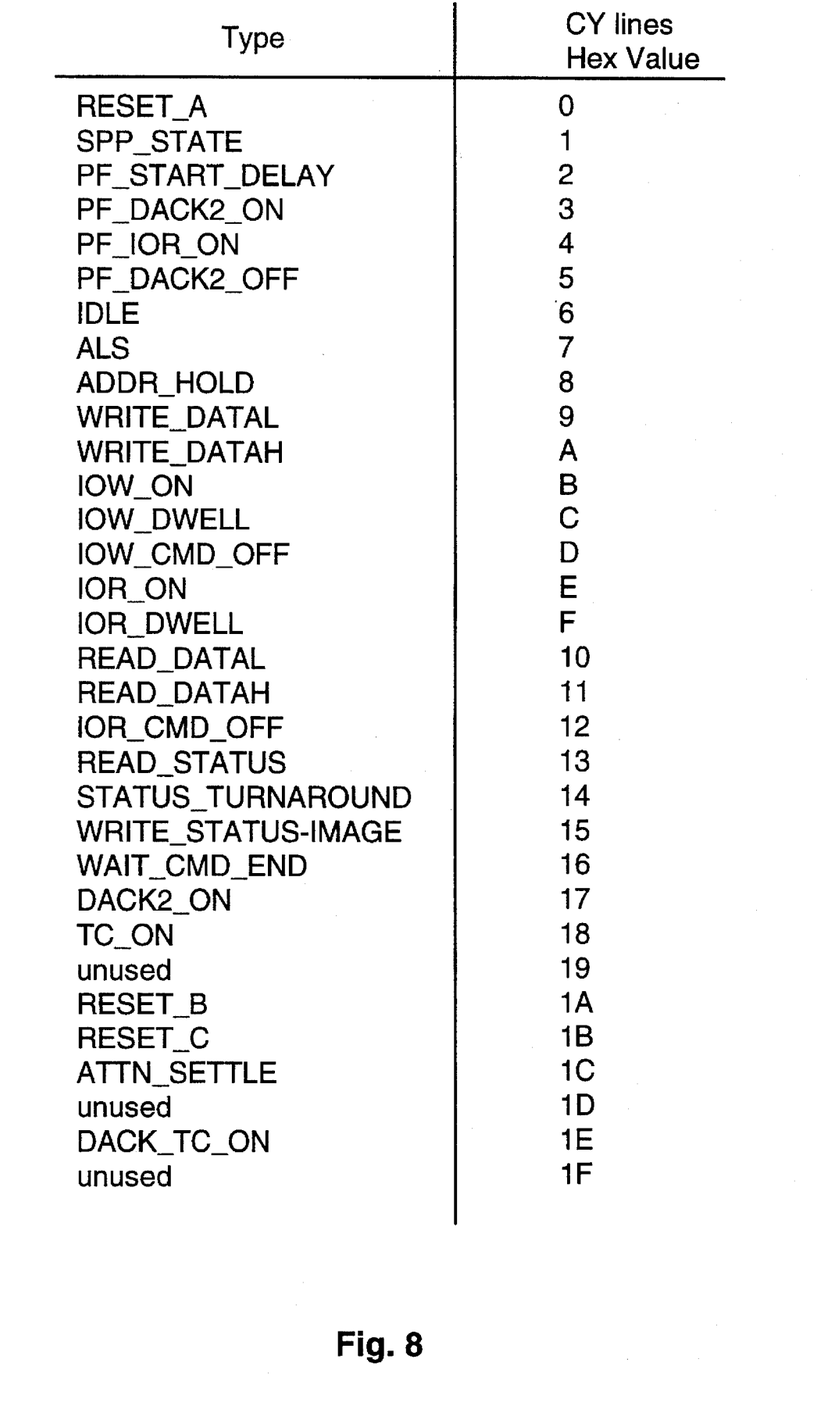
FIG. 8 is a table of state descriptions for the PIO port of FIG. 3.

FIG. 8 displays the $E^2P^2$ AD cycles by type and corresponding hex value on the CY lines.

Figure 9:
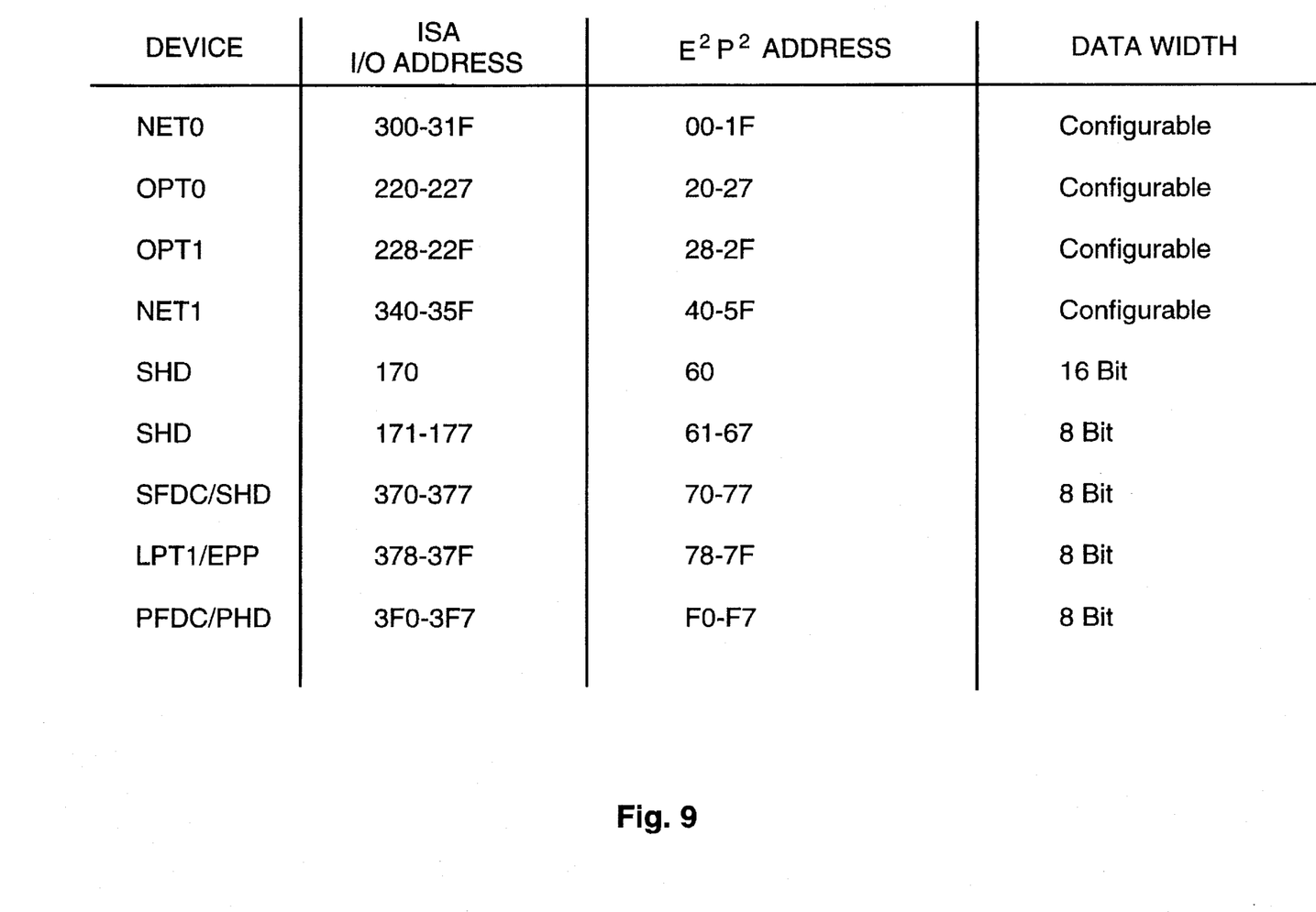
FIG. 9 is a table of internal to external device I/O address translations and data sizes.

FIG. 9 is a table indicating peripheral I/O devices supported by $E^2P^2$ in the embodiments described herein. I/O device address translation mapping between 10-bit ISA bus values and 8-bit $E^2P^2$ bus values are indicated. Other embodiments might use different mappings for the same I/O devices or map a different set of I/O devices. 16-bit data values are multiplexed though the $E^2P^2$ bus as two consecutive 8-bit values. When a program step causes CPU 25 to address an I/O address in column 2 of the table and the enable bit for that device is set in Mode Register 75, port state controller 71 routes the I/O address bits to address mapper 69, which performs the address translation and loads the 8-bit address value into Address Strobe Register 65.

In FIG. 9 the following abbreviations are used:
NET=Network Device
OPT=Optional Device
SHD=Secondary Hard Disk Controller
SFDC=Secondary Floppy Disk Controller
LPT=Line Printer
PFDC=Primary Floppy Disk Controller
PHD=Primary Hard Disk Controller In operation a computer equipped with $E^2P^2$ employs a start up routine that comprises a "tickle" operation for querying the parallel port(s) to discover the nature of devices connected thereto. Typically the tickle routine is a program step or steps in the computer BIOS for sending a code to one of the pins on the parallel port. The tickle code could be a series of logical high signals in a specified period of time, or some other code.

As an operating example an $E^2P^2$ computer with an external floppy disk connected to the parallel port would tickle the port (at a specific pin) on start up, and the External floppy would, if equipped for $E^2P^2$, answer on a "handshake" line, whereupon the start up routine would set the operating mode for $E^2P^2$. The tickle routine could similarly discover if the mode should be EPP or SPP.

DMA Prefetch

Memory devices such as disk drives using $E^2P^2$ are always remote, connected either singly over a cable of up to three meters, or in, or tethered to, a docking box communicating through a cable and $E^2P^2$ interfaces. This remote placement, as opposed to local placement for typical conventional systems, poses a memory access problem that is handled through firmware at the $E^2P^2$ host interface circuitry.

Data transfer from a floppy disk device to the host system is exemplary. In a conventional system the floppy controller is installed locally, i.e in the same frame as the host system. For every byte of data to be transferred from the floppy to the host during a floppy read operation, the floppy controller first makes a data request signal (DRQ) to the system's DMA controller. There is no indication from the floppy controller whether this is a request to read data or to write data. The DMA controller is pre-programmed by the system software to respond with either a read or a write acknowledge signal.

In the $E^2P^2$ implementation the floppy controller is remote, communicating over a cable of up to three meters in length. In this case, when the floppy controller makes a data transfer request for a read operation, the $E^2P^2$ host circuitry intercepts the request and gets the data from the floppy controller before passing the request on to the host system. This is necessary because a device making a DMA transfer request to the system is required to have the data ready for writing to system memory at the time of the request. In the case of the remote floppy communicating over the $E^2P^2$ cable some time is required to transfer the data over the cable. So the $E^2P^2$ system is configured to prefetch the floppy data before making the transfer request to the host system.

When $E^2P^2$ sees the initial DRQ signal from the floppy controller it has to have some way of knowing whether the request is to read data or to write data. Only the DMA hardware "knows" for sure, as a result of host system programming. Accordingly, the $E^2P^2$ is configured with "trap" hardware to watch for the specific host system instruction to the DMA that sets it up for servicing floppy read data requests. When this instruction is trapped, then the $E^2P^2$ system knows to respond to the next series of DRQ's as read requests and to prefetch the data from the floppy and present it to the system bus before passing on the DRQ to the system DMA controller. The inventors refer to this capability as a "premonition pipeline".

After intercepting a read setup command for DMA, $E^2P^2$ continues to interpret DRQ's from the floppy as read requests until another command that is not a read setup command to the DMA is intercepted.

Pinouts

Figure 10:
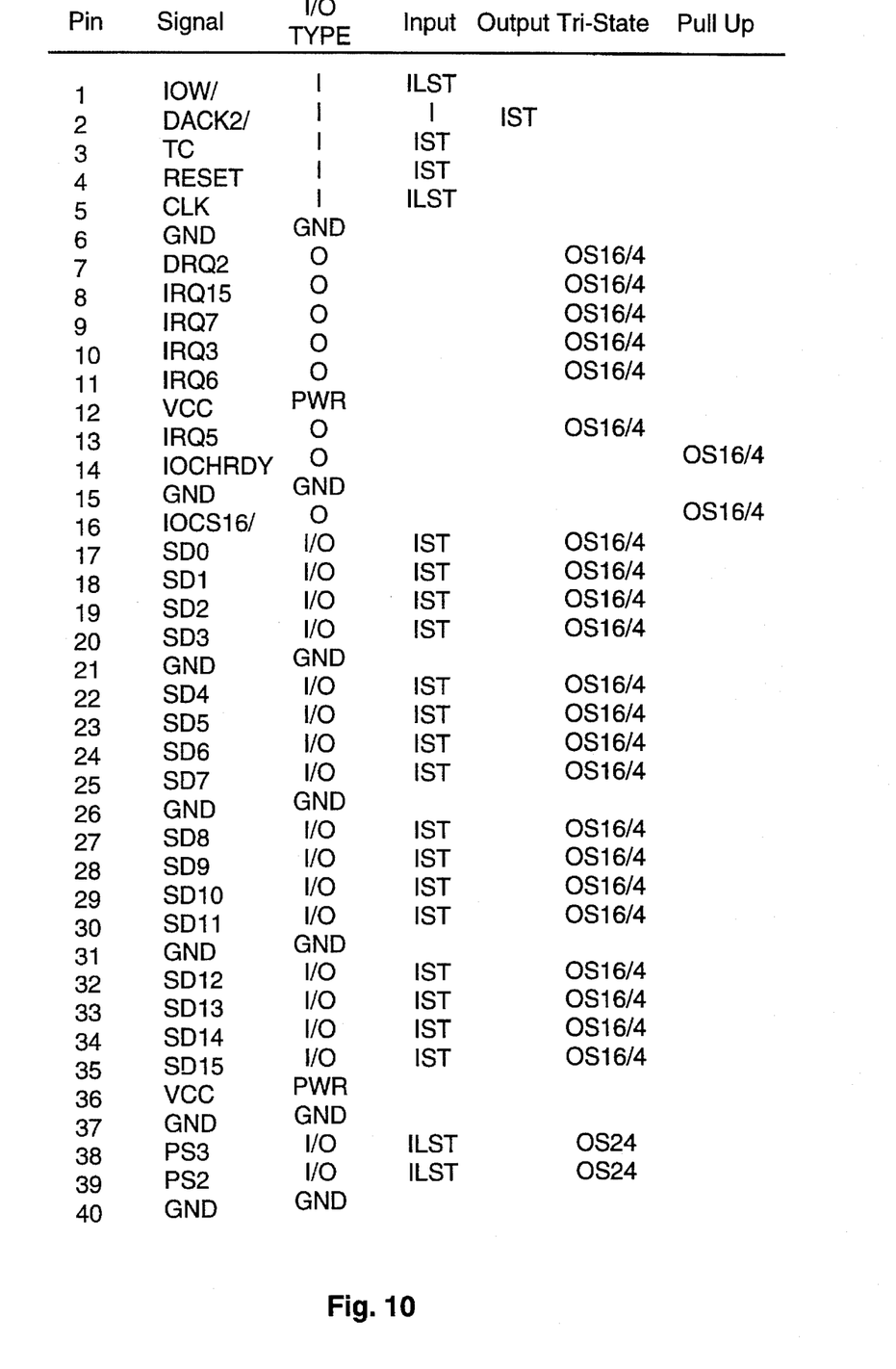
FIG. 10 is a pinout listing for pins 1–40 of a master state-translation and control device according to the invention.
Figure 11:
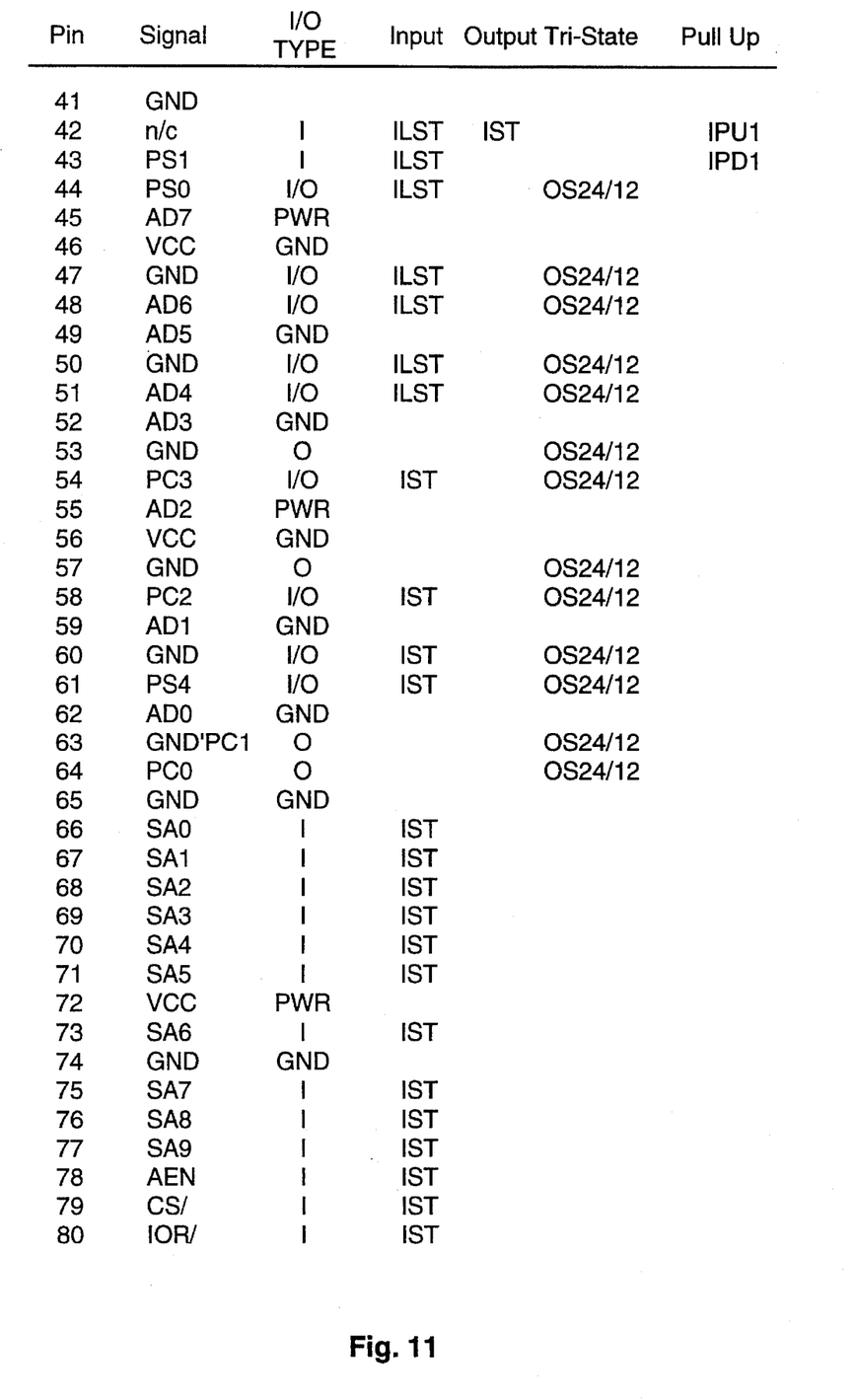
FIG. 11 is a pinout listing of pins 41–80 for the master device of FIG. 10.

In a preferred embodiment, as described above, the $E^2P^2$ master circuitry at the host system end is implemented as an ASIC and the slave circuitry at the remote end of the $E^2P^2$ bus is implemented as a second ASIC. FIG. 10 and 11 comprise a pinout listing for the host master ASIC in this embodiment, FIG. 10 listing pins 1–40, and FIG. 11 listing pins 41–80.

Relative to the master chip in this embodiment, when the chip is powered down (VCC=0 volts), all pins that are designated as having OS24/12 or OS24 outputs must be capable of sinking 22 milliamps through their ESD diode to ground. The die must be able to sink this current indefinitely on all OS24/12 and OS24 output pins simultaneously. Additionally, all output drivers have slew rate limiting with a time constant of approximately 4 nanoseconds.

In addition to the above, OS16/4 indicates a tri-state driver that can sink 16 ma and source 4 ma. OS24/12 indicates a tri-state output driver that can sink 24 ma and source 12 ma. Pins PS2 and PS3 must sink and source 24 ma.

Figure 12:
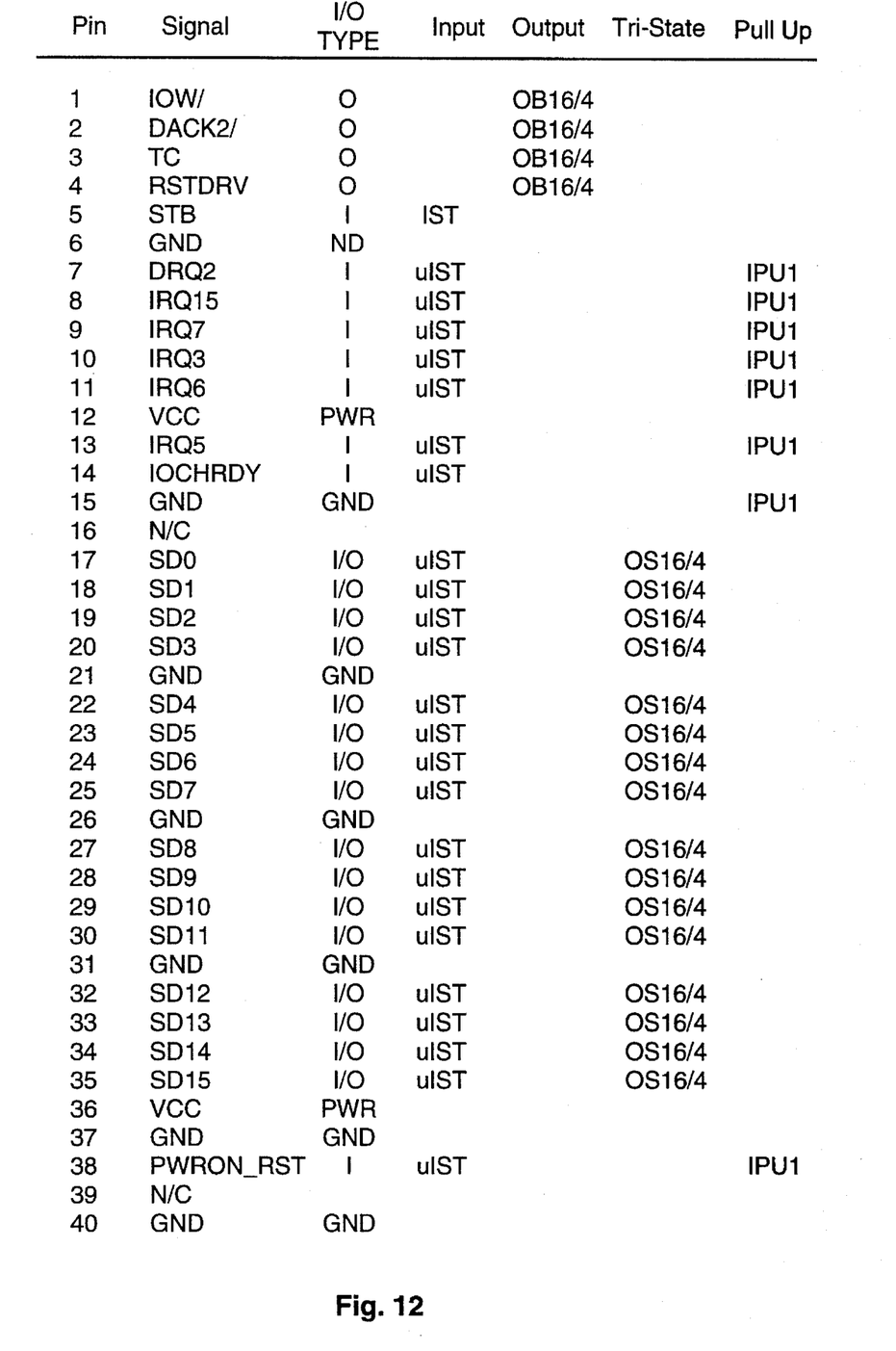
FIG. 12 is a pinout listing for pins 1–40 of a slave state-translation device according to the invention.
Figure 13:
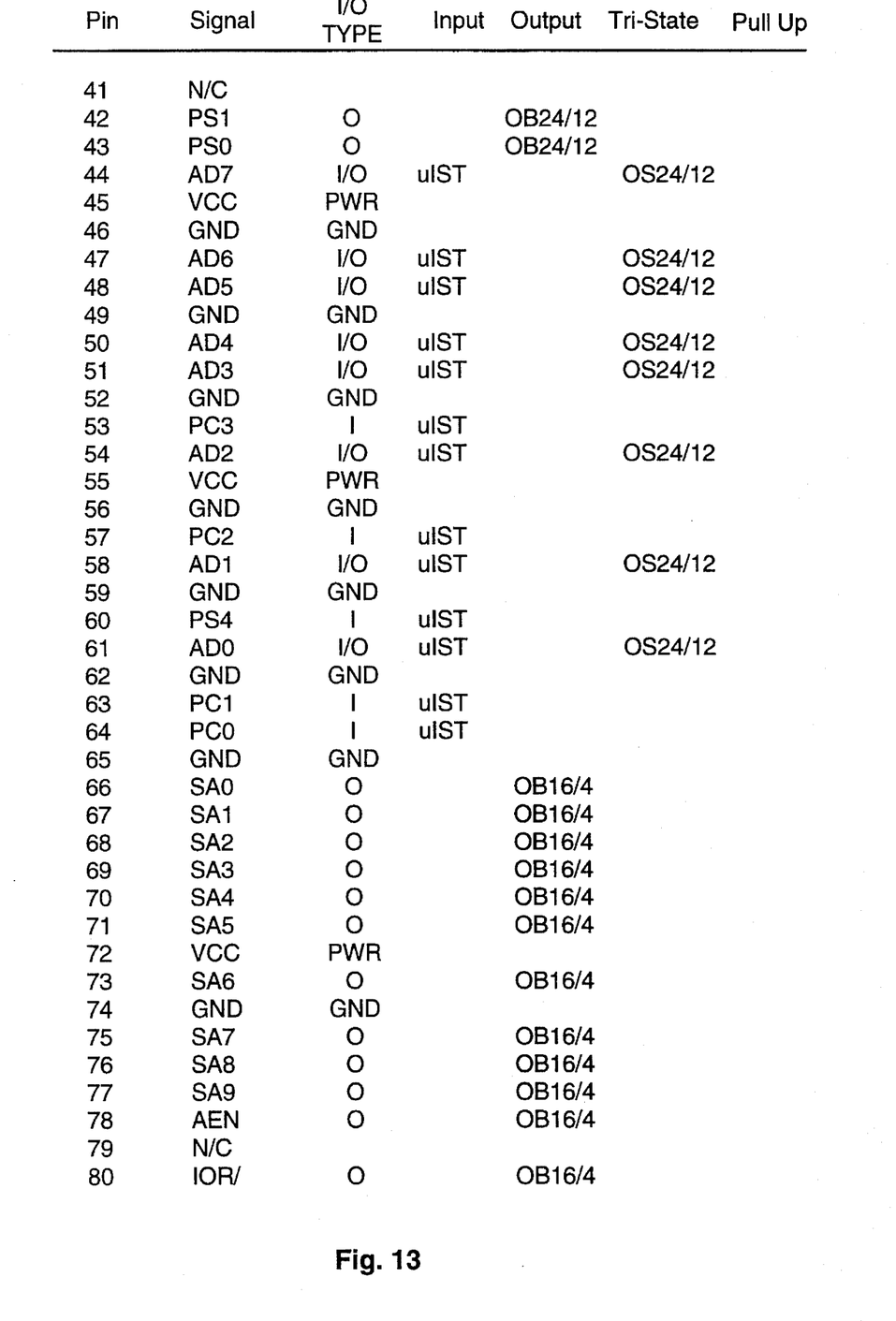
FIG. 13 is a pinout listing for pins 41–80 of the slave device of FIG. 12.

FIG. 12 is a pinout listing for pins 1–40 of the slave ASIC, and FIG. 13 is a pinout listing for pins 41–80 of the slave ASIC. Relative to the slave chip in this embodiment, when the chip is powered down (VCC=0 volts), all pins that are designated as having OS24/12 or OS24 outputs must be capable of sinking 22 milliamps through their ESD diode to ground. The die must be able to sink this current indefinitely on all OS24/12 and OS24 output pins simultaneously. Additionally, all output drivers have slew rate limiting with a time constant of approximately 4 nanoseconds.

In addition to the above, OS16/4 indicates a tri-state driver that can sink 16 ma and source 4 ma. OS24/12 indicates a tri-state output driver that can sink 24 ma and source 12 ma. Pins PS2 and PS3 must sink and source 24 ma. Also, OB 16/4 indicates an output driver that can sink 16 ma and source 4 ma.

There is one register in the slave chip, the Status Image Register, mentioned briefly above. The data in this register is driven onto the AD[7:] wires when a Read Status Image cycle is performed on the slave. This register can be written via the AD[7:0] wires when a Write Status Image command is sent to the slave from the master. This register is not directly read/writable by the host system.

It will be apparent to those with skill in the art that there are many alterations in detail that might be made without departing from the spirit and scope of the invention. Some of these are described above. The scope of the invention is limited only by the breadth of the claims.

What is claimed is:

1. A computer having a CPU and an industry standard internal I/O (ISA) bus, comprising:

a standard parallel port (SPP) connector; and a state-translation circuitry connected between said internal I/O bus and said SPP connector, once configured automatically and independently of the CPU and dedicated device driver software, multiplexing signals of the internal ISA bus onto pins of SPP connector, the signals including address signals from address lines of the internal bus;

wherein said CPU, upon power-up and reset of said computer, tests devices connected to the internal bus through the SPP connector for compatibility with a standard parallel port (SPP) communication mode, a standard enhanced parallel port (EPP) communication mode, and with a proprietary $E^2P^2$ communication mode, and configures the state-translation circuitry to operate in an appropriate mode according to the results of the compatibility tests performed during power-up and reset.

2. A computer as in claim 1 further comprising an on-board storage power supply connected to selected pins of said SPP connector for providing power to a peripheral I/O device coupled to said SPP connector, wherein said storage power supply provides power to said peripheral I/O device through or derives charging power from said selected pins during communication across said SPP connector.

3. A peripheral I/O non-volatile mass storage device comprising:

a standard parallel port (SPP) connector for interfacing with a host computer through an intermediate bus link of lesser width than internal I/O bus of said host computer; and a state translation circuitry connected between said SPP connector and a controller within said I/O mass storage device;

wherein said state-translation circuitry, automatically and independently of the host computer and dedicated device driver software within said host computer, synthesizes ISA bus signals from address, data and control signals multiplexed on said intermediate bus link by a host device in accordance with a proprietary $E^2P^2$ communication mode; said ISA bus signal having the same width and the same parallel structure of signal in the internal I/O bus of the host computer.

4. A peripheral I/O mass storage device as in claim 3 wherein power for operation of the mass storage device is provided over said intermediate bus link.

5. A docking box for expanding the I/O capability of a computer, comprising:

a standard parallel port (SPP) connector for interfacing with a host computer through an intermediate bus link of lesser width than internal I/O bus of said host computer;

a state-translation circuitry connected between said SPP connector and a parallel bus within said docking box, said parallel bus having the same width and the same parallel structure of the internal I/O bus of the host computer; and one or more peripheral I/O devices connected to said parallel bus, the peripheral I/O devices being one or more of a network port with an external connector for interfacing to a serial cable, a controller for connecting to a hard disk drive, a controller for connecting to a floppy disk drive, a serial communication port with an external serial connector, and a printer port with an external connector for interfacing to a printer;

wherein said state-translation circuitry, automatically and independently of the host computer and dedicated device driver software within said host computer, synthesizes bus signals onto the parallel bus within the docking box from multiplexed address, data, and control signals on said intermediate bus link by a host device in accordance with a proprietary $E^2P^2$ communication mode; said bus signal having the same width and the same parallel structure of signal in the internal I/O bus of the host computer.

6. A docking box as in claim 5 further comprising a primary power supply connected to selected pins of said SPP connector for charging a storage power supply of a docked computer.

* * * * *